United States Patent
Ramirez Monarrez et al.

(10) Patent No.: US 10,208,514 B2
(45) Date of Patent: Feb. 19, 2019

(54) DOOR LOCK TRANSITION METHOD AND ASSEMBLY

(71) Applicant: Ford Global Technologies, LLC, Dearborn, MI (US)

(72) Inventors: Monica Ramirez Monarrez, Coacalco (ME); Adrian Romero Regalado, Cuautitlan Izcalli (ME); Elizabeth Ramirez Monarrez, Coacalco (ME)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 15/466,219

(22) Filed: Mar. 22, 2017

(65) Prior Publication Data

US 2018/0272911 A1    Sep. 27, 2018

(51) Int. Cl.
    *E05B 77/26*    (2014.01)
    *E05B 77/24*    (2014.01)

(52) U.S. Cl.
    CPC .............. *E05B 77/26* (2013.01); *E05B 77/24* (2013.01)

(58) Field of Classification Search
    CPC .................................. E05B 77/24; E05B 77/26
    See application file for complete search history.

(56) References Cited

U.S. PATENT DOCUMENTS

| | | | |
|---|---|---|---|
| 4,785,907 A * | 11/1988 | Aoki | E05B 77/12 180/274 |
| 6,081,758 A | 6/2000 | Parvulescu | |
| 6,895,312 B2 * | 5/2005 | Iida | B60R 21/013 180/277 |
| 7,352,081 B2 | 4/2008 | Taurasi | |
| 7,471,192 B2 * | 12/2008 | Hara | B60R 25/04 340/425.5 |
| 7,532,107 B2 * | 5/2009 | Hara | B60R 25/00 307/10.2 |
| 8,909,430 B2 | 12/2014 | Choi et al. | |
| 9,334,681 B2 | 5/2016 | Fernandez-Aguilera et al. | |
| 9,792,806 B2 * | 10/2017 | Poder | B60R 25/102 |
| 9,892,580 B2 * | 2/2018 | Imsdahl | G07C 9/00309 |
| 9,928,674 B2 * | 3/2018 | Imsdahl | G07C 9/00309 |
| 2006/0049921 A1 * | 3/2006 | Hara | B60R 25/00 340/426.1 |
| 2006/0049925 A1 * | 3/2006 | Hara | B60R 25/04 340/435 |

(Continued)

FOREIGN PATENT DOCUMENTS

| | | |
|---|---|---|
| CN | 203485855 | 3/2014 |
| CN | 104276135 | 1/2015 |

(Continued)

*Primary Examiner* — Peter D Nolan
(74) *Attorney, Agent, or Firm* — Carlson, Gaskey & Olds, P.C.

(57) ABSTRACT

An exemplary door lock transition method includes transitioning a door lock of a vehicle from a deactivated state to an activated state based on a door lock schedule that includes a deactivated period where the door lock is scheduled to be in the deactivated state, and an activated period where the door lock is scheduled to be in the activated state. An exemplary door lock transition assembly includes, a door lock of a vehicle, and a control system configured to transition the door lock from a deactivated state to an activated state based on a door lock schedule.

18 Claims, 4 Drawing Sheets

(56) References Cited

U.S. PATENT DOCUMENTS

| | | | | |
|---|---|---|---|---|
| 2006/0181152 | A1* | 8/2006 | Taurasi | B60R 25/00 |
| | | | | 307/10.2 |
| 2008/0140400 | A1* | 6/2008 | Blass | G10L 15/22 |
| | | | | 704/246 |
| 2010/0222939 | A1* | 9/2010 | Namburu | G07C 9/00111 |
| | | | | 701/2 |
| 2013/0231784 | A1* | 9/2013 | Rovik | G05B 15/02 |
| | | | | 700/276 |
| 2015/0330115 | A1* | 11/2015 | Kleve | E05B 77/48 |
| | | | | 292/216 |
| 2016/0097224 | A1* | 4/2016 | Fernandez-Aguilera | |
| | | | | E05B 77/12 |
| | | | | 701/45 |
| 2016/0129851 | A1 | 5/2016 | Werner | |
| 2016/0321911 | A1* | 11/2016 | Poder | B60R 25/102 |
| 2017/0161977 | A1* | 6/2017 | Imsdahl | G07C 9/00309 |
| 2017/0249792 | A1* | 8/2017 | Gennermann | G07C 9/00142 |
| 2017/0350168 | A1* | 12/2017 | Creguer | E05B 77/26 |
| 2017/0372547 | A1* | 12/2017 | Fujiwara | G06F 21/44 |
| 2017/0374047 | A1* | 12/2017 | Fujiwara | H04L 63/061 |
| 2018/0018842 | A1* | 1/2018 | Imsdahl | G07C 9/00309 |
| 2018/0080263 | A1* | 3/2018 | Rose | E05B 81/18 |
| 2018/0102010 | A1* | 4/2018 | Segura Salgado | |
| | | | | G07C 9/00857 |

FOREIGN PATENT DOCUMENTS

| | | |
|---|---|---|
| DE | 10336602 | 3/2005 |
| KR | 1020130005111 | 1/2013 |

\* cited by examiner

DOOR LOCK TRANSITION METHOD AND ASSEMBLY

TECHNICAL FIELD

This disclosure relates generally to a vehicle door lock and, more particularly, to scheduling time periods where the door lock is transitioned to an activated state and other time periods where the door lock is transitioned to a deactivated state.

BACKGROUND

Vehicles typically include door locks. When activated, the door locks prevent opening an associated door of the vehicle. When deactivated, the door locks permit opening the associated door of the vehicle.

Some vehicles additionally include child locks. When activated, the child locks prevent opening an associated door of the vehicle using an interior handle of that door. When deactivated, the child locks permit opening the associated door using the interior handle of that door. The child locks are activated to, among other things, prevent a child within the vehicle from opening doors of the vehicle. Childs lock are particularly used in connection with the rear doors of vehicle.

The child lock is typically activated or deactivated via a switch in a frame of the associated door. The switch is accessible when the door is open, but not when the door is closed. Thus, to interact with the switch, an operator must open the door.

SUMMARY

A method, according to an exemplary aspect of the present disclosure includes, among other things, transitioning a door lock of a vehicle from a deactivated state to an activated state based on a door lock schedule that includes a deactivated period where the door lock is scheduled to be in the deactivated state, and an activated period where the door lock is scheduled to be in the activated state.

A further non-limiting embodiment of the foregoing method includes adjusting the door lock schedule in response to an input.

In a further non-limiting embodiment of any of the foregoing methods, input is provided by an occupant of the vehicle interacting with a touch screen display.

A further non-limiting embodiment of any of the foregoing methods includes transitioning in response to the deactivated period changing to the activated period.

A further non-limiting embodiment of any of the foregoing methods includes preventing an opening of a rear door from inside a passenger compartment of a vehicle when the door lock is in the activated state.

A further non-limiting embodiment of any of the foregoing methods includes transitioning the door lock from the activated state to the deactivated state based on the door lock schedule.

A further non-limiting embodiment of any of the foregoing methods includes overriding the door lock schedule by transitioning the door lock from the activated state to the deactivated state during the activated period. The overriding is based on a direct input from an operator of the vehicle.

A further non-limiting embodiment of any of the foregoing methods includes overriding the door lock schedule by transitioning the door lock from the activated state to the deactivated state during the activated period. The overriding is based on an impact event.

In further non-limiting embodiment of any of the foregoing methods, the door lock is a child lock.

In further non-limiting embodiment of any of the foregoing methods, the door lock is a first door lock associated with a first door of the vehicle, and further comprising transitioning a second door lock associated with a second door of the vehicle together with the first door lock.

In further non-limiting embodiment of any of the foregoing methods, the transitioning is automatic.

An assembly according to another exemplary aspect of the present disclosure includes, a door lock of a vehicle, and a control system configured to transition the door lock from a deactivated state to an activated state based on a door lock schedule.

A further non-limiting embodiment of the foregoing assembly includes a display with a user interface. The door lock schedule is adjustable through the user interface.

In a further non-limiting embodiment of any of the foregoing assemblies, the door lock is a rear door child lock.

In a further non-limiting embodiment of any of the foregoing assemblies, the control system is further configured to transition the door lock from the activated state to the inactivated state based on the door lock schedule.

A further non-limiting embodiment of any of the foregoing assemblies includes a rear door of the vehicle. The lock, when in the activated state, prevents opening the rear door from inside a passenger compartment.

In a further non-limiting embodiment of any of the foregoing assemblies, the door lock schedule includes a deactivated period where the door lock is scheduled to be in the deactivated state, and an activated period where the door lock is scheduled to be in the activated state.

A further non-limiting embodiment of any of the foregoing assemblies includes a door lock override switch configured to actuate to cause the door lock to transition from the activated state to the deactivated state during the activated period.

In a further non-limiting embodiment of any of the foregoing assemblies, the door lock override switch is configured to actuate in response to a direct input from a user.

In a further non-limiting embodiment of any of the foregoing assemblies, the door lock is a first door lock associated with a first door of the vehicle, and the assembly further includes a second door lock associated with a second door of the vehicle. The control system is further configured to transition the second door lock together with the first door lock based on the door lock schedule.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to vehicle door locks and, in particular, to scheduling time periods where the door locks are automatically activated, and other time periods where the door locks are automatically deactivated. The door locks can be a child locks associated with rear doors of the vehicle, for example.

Figure 1:
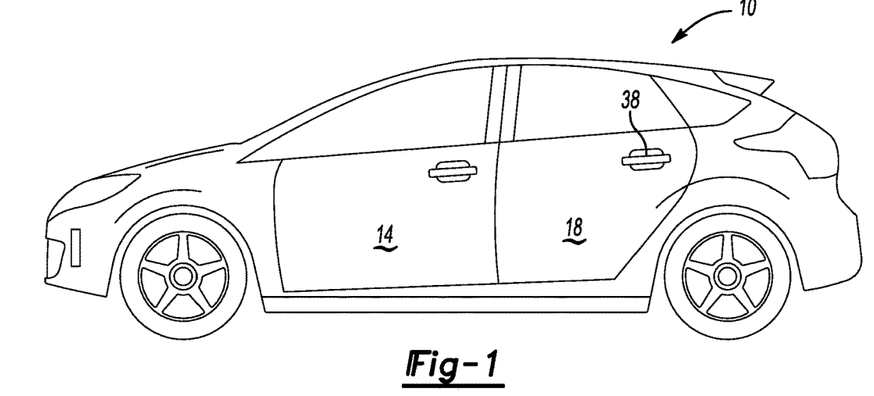
FIG. 1 illustrates a side view of an example vehicle having doors and door locks.
Figure 2:
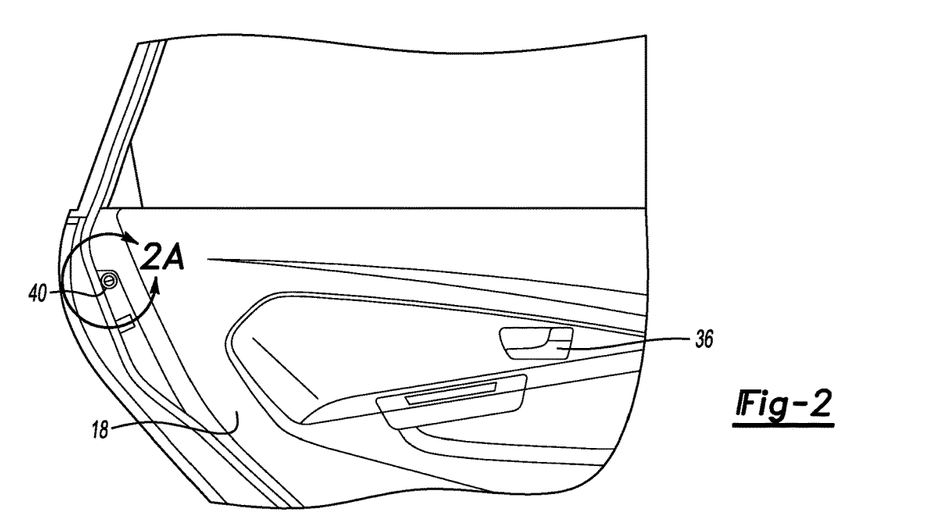
FIG. 2 illustrates a perspective view of an interior side of a rear door of the vehicle of FIG. 1 when the rear door is open.
Figure 2A:
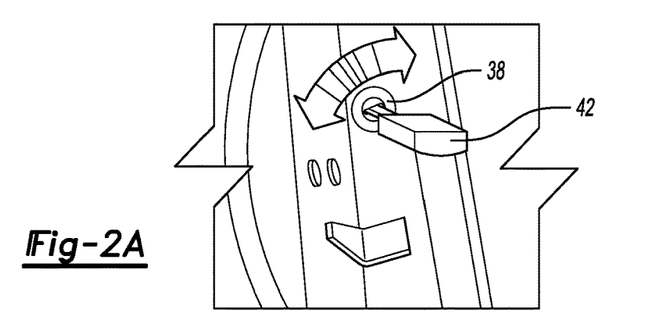
FIG. 2A illustrates a close-up view of an area of FIG. 2.
Figure 3:
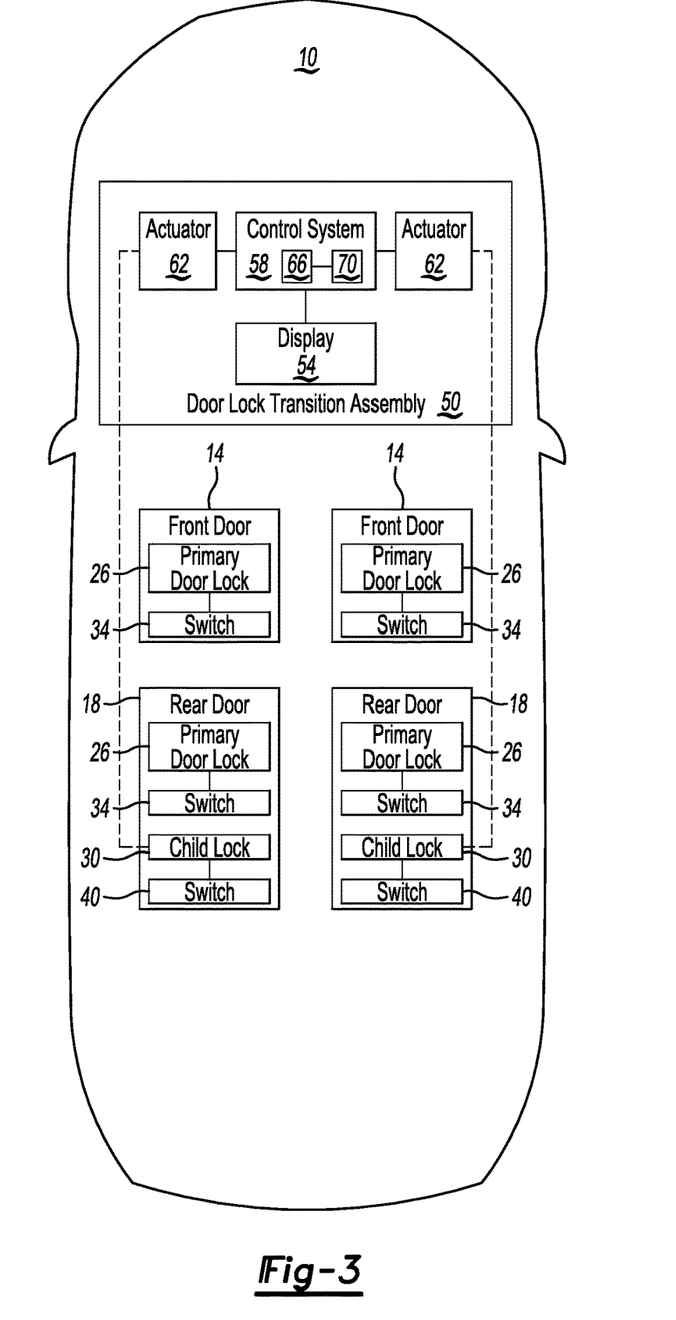
FIG. 3 illustrates a highly schematic view of selected portions of the vehicle of FIG. 1.

Referring to FIGS. 1 to 3, an exemplary vehicle 10 includes a pair of front doors 14, a pair of rear doors 18, primary door locks 26, and child locks 30. The front doors 14 and the rear doors 18 are each associated with one of the primary door locks 26. The rear doors 18 are each associated with one of the child locks 30. The primary door locks 26 and the child locks 30 are each exemplary types of door locks.

The primary door locks 26 can transition back and forth between an activated state and a deactivated state. In the activated state, the primary door locks 26 prevent opening the associated front door 14 or rear door 18 from outside the vehicle 10. When the primary door locks 26 are in the deactivated state, the primary door locks 26 do not interfere with opening the associated front door 14 or rear door 18.

The front doors 14 and rear doors 18 typically include a switch 34 that is actuated to trigger transition of the primary door locks 26 from the activated to the deactivated state, and from the deactivated to the activated state. The switch 34 could be a toggle switch, for example, located in an interior door panel of the associated front door 14 or rear door 18.

The child locks 30 can also transition back and forth between an activated state and a deactivated state. In the activated state, the child lock 30 prevents a rear seat passenger from opening the associated rear door 18 using an interior handle 36 (FIG. 2) of the rear door 18, but permits opening the associated rear door 18 from outside the passenger compartment using an exterior handle 38 (FIG. 1) of the rear door 18.

A manual switch 40 can be used to transition the child locks 30 back and forth between the activated state and the deactivated state. Moving the manual switch 40 to a first position activates the child lock 30 for the associated rear door 18, and moving the manual switch 40 to a second position deactivates the child lock 30 for the associated rear door 18.

Moving the manual switch 40 can be time consuming because, as shown in of FIG. 2, the manual switch 40 is typically positioned in an edge of the rear door 18 and is covered when the rear door 18 is closed. Thus, opening the rear door 18 may be required to access the manual switch 40. Further, as shown in this example, a key 42 is required to manipulate the manual switch 40 between the first and second position. Requiring the key 42 can reduce the likelihood that someone, such as a child, can tamper with the manual switch 40 when the rear door 18 is open. In other examples, the manual switch 40 can be actuated without the key 42.

When activated, the child locks 30 effectively prevent the rear seat passenger from opening the rear doors 18 when the vehicle 10 is stationary and when the vehicle 10 is moving. In the deactivated state, the child lock 30 does not interfere with the rear seat passenger opening the associated rear door 18.

The child locks 30 are typically placed in the activated state when the rear seat passenger is a child. The child locks 30 substantially prevent the child in the rear seat from opening the rear doors 18. Instead, to open the rear doors 18, the child must rely on another individual outside the passenger compartment.

As can be appreciated, the child lock 30 can complicate the egress of passengers from the rear seat of the vehicle 10 when in the activated state. Complicating egress of the rear seat passenger can be desirable in some situations, and undesirable in other situations.

For example, when the child is the rear seat passenger, complicating the egress from the rear seat may be desirable. The child lock 30, when activated, would prevent the child from opening the rear door 18 when the vehicle 10 is moving.

There are times, however, where deactivating child locks 30 may be desired. For example, if the rear seat passenger is an adult, preventing the adult from opening the rear door 18 is generally not desirable. The adult is unlikely to open the rear door 18 when the vehicle 10 is moving. Further, relying on another person to open the rear door 18 from outside the vehicle 10 is burdensome.

While the operator could interface with the manual switch each time transitioning the child locks 30 between the activated and deactivated states is desired, this approach is burdensome. If the manual switch 40 is the only way to transition the child locks 30 back and forth between the activated state and the deactivated state, the rear door 18 must be opened each time a transition is desired. The repeated opening of the rear door 18 to access the manual switch 40 can be especially burdensome if an operator of the vehicle 10 needs to relatively frequently transition the child locks 30 between the activated and the deactivated states.

Relatively frequent transitions can be desired if, for example, the operator uses rear seat of the vehicle 10 to sometimes transport coworkers (i.e., adults) and other times to transport a child. In such an example, the operator of the vehicle 10 may desire the child locks 30 to be in the deactivated state during business hours, but in the activated state at other times. If the manual switch 40 were the exclusive mechanism for triggering the transition of the child locks 30, the operator would need to open each rear door 18 to access each of the manual switches 40 a few times per day.

The exemplary vehicle 10 incorporates a door lock transition assembly 50 that automatically transitions the child locks 30 back and forth between the deactivated state and the activated state in response to a door lock schedule. Generally, in this exemplary non-limiting embodiment, the door lock schedule includes time periods wherein the child locks 30 should be deactivated, and other time periods where the child locks 30 should be activated. The door lock transition assembly 50 accommodates frequent transitions of the child locks 30 without overly burdening the operator.

In an exemplary non-limiting embodiment, the door lock transition assembly 50 includes, among other things, a display 54, a control system 58, and an actuator 62 associated with the child locks 30 for each of the rear doors 18.

The display 54 can display a user interface to the operator of the vehicle 10. The display 54 can be a touch screen display on a center console of the vehicle 10, for example.

The control system 58 includes a processor 66 and a memory portion 70. The control system 58 may include one or more control modules equipped with executable instructions for interfacing with and commanding operation of various components of the vehicle 10. Each such control module may include a processing unit and non-transitory memory for executing the various control strategies and modes of the vehicle system 60.

The processor 66, in this example, is configured to execute one or more programs stored in the memory portion 70. An example program, when executed, can adjust a door lock schedule in response to an input, such as the operator interacting with the display 54. Another example program, when executed, can activate or deactivate the child locks 30 according to the door lock schedule.

The actuator 62 refers generally to any type of device suitable for transitioning the child locks 30 from the activated to the deactivated state, or from the deactivated state to the activated state. Examples of the actuator 62 can include mechanical devices, electronic devices, or some combination of these.

In this exemplary embodiment, the operator adjusts the door lock schedule by interacting with the display 54. The operator can, for example, initiate the adjustment to the door lock schedule by accessing an option within a settings menu accessed via the display 54. The operator can adjust the door lock schedule by changing at least one deactivated period for the child lock 30, at least one activated period for the child lock 30, or both.

Further, in this exemplary embodiment, the child lock 30 associated with the driver side rear door 18, and the child lock 30 associated with the passenger side rear door 18 both adjust in response to the door lock schedule. In another example, only one of the child locks 30, say the child lock 30 associated with the driver side rear door, adjusts in response to the door lock schedule. Further, one door lock schedule could be established for the child lock 30 associated with the passenger side rear door 18, and another, separate, door lock schedule could be established for the child lock 30 associated with the driver side rear door 18.

Controlling the child lock 30 associated with the driver side rear door 18 in response to the door lock schedule separately from the child lock 30 associated with the passenger side rear door 18 can be desirable if a child typically sits on one side of the vehicle 10. For example, if a child's booster seat is on the driver side of the rear seat, the child would likely only sit on the driver side rear seat. The door lock schedule and door lock transition assembly 50 can then be configured to adjust the child lock 30 associated with the driver side rear door 18, but not the child lock 30 associated with the passenger side rear door 18. In such an example, adjustments to the child lock 30 associated with the passenger side rear door 18 may not be required since the child is located on the driver side of the rear seat.

Figure 4:
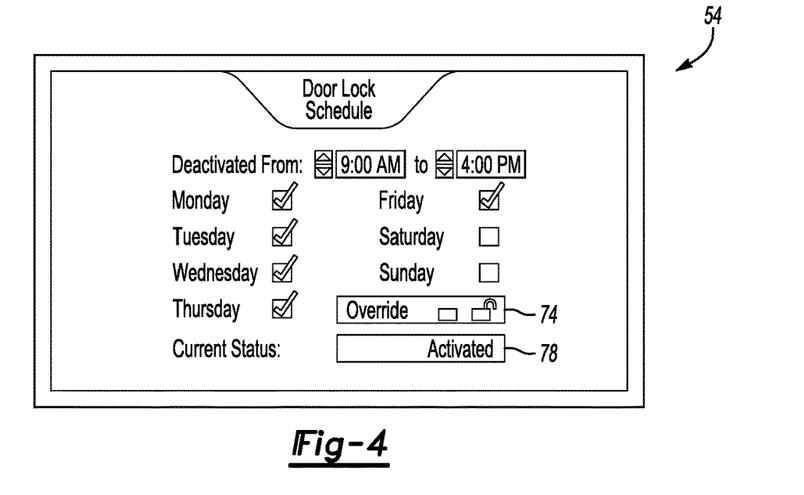
FIG. 4 illustrates a display from an interior of the vehicle of FIG. 1.

Referring to FIG. 4, with continuing reference to FIG. 3, the display 54 can show a visual representation of an exemplary door lock schedule. With the door lock schedule, the operator can program the specific days and hours where the child locks 30 should be deactivated, and the specific days and hours where the child locks 30 should be activated.

In the example of FIG. 4, the operator has adjusted the door lock schedule to include deactivated periods for the child lock 30 on Monday through Friday from 9:00 am to 4:00 pm, which may correspond to the normal business hours for the operator. The remaining times—weekdays before 9:00 am, weekdays after 4:00 pm, and weekends—are then considered activated periods.

The control system 58 automatically transitions the child locks 30 according to the door lock schedule shown on the display 54. The transitioning by the control system 58 overrides any positioning of the manual switch 40. That is, even if the manual switch 40 is in the first position corresponding to the child lock 30 being activated, the control system 58 causes the actuators 62 to move and hold the child locks 30 in the deactivated state on weekdays from 9:00 am to 4:00 pm.

While an example interface is shown in FIG. 4, a person having skill in this art and the benefit of this disclosure could conceive of various other ways to provide an interface to the operator that can be used to adjust a door lock schedule. For example, the operator could adjust the door lock schedule using a personal computer remote from the vehicle 10. The adjustments are then transmitted to the memory portion 70 of the control system 58 using a cloud-based server.

In another example, the display 54 displays the days in a selected month, say December, to the operator. The operator then taps the display 54 to select one or more days in December, and then adjusts the deactivated periods or the activated periods for those days. If the operator has a planned extended absence from work, say the third week in December, the operator can select that week and change the entire week to an activated period. If the operator is absent from work, the operator may be more likely to transport children in the rear seat than adults.

The example display 54 additionally includes an override toggle 74 and a status indicator. The operator can interface with the override toggle 74 to override the state of the child locks 30 based on the door lock schedule. For example, if the operator happens to transport a child in the rear seat of the vehicle 10 during working hours, say Monday at 10:00 AM, the child locks 30 would initially be in the deactivated state based on the door look schedule of FIG. 4. To override this selection, the operator taps the override toggle 74, which causes the child locks 30 to transition to the activated state. The interaction with the override toggle 74 is considered a direct input from the operator of the vehicle 10 since the child locks 30 transition between states directly in response to the operator's interaction with the override toggle 74.

Although shown on the door lock schedule screen in FIG. 4, the override toggle 74 could be accessible from other screens, such as a home screen of the display 54. Further, the override toggle 74 could be a physical toggle that is positioned within, for example, an interior of the driver side front door 14.

The status indicator 78 indicates the current status of the child locks 30. The status indicator 78 changes automatically in response to the current state of the child locks 30.

Figure 5:
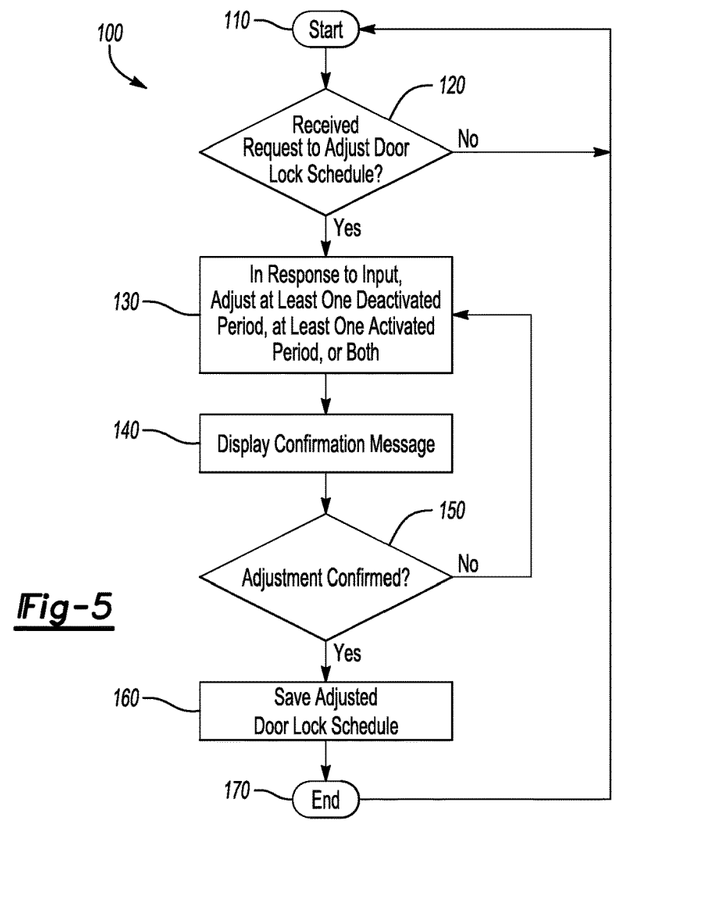
FIG. 5 illustrates a flow of an example door lock schedule adjusting method utilized by a control system within the vehicle of FIG. 1.

Referring now to FIG. 5, with continuing reference to FIG. 3, the control system 58 can adjust the door lock schedule using a door lock schedule adjusting method 100. After starting at a step 110, the method moves to a step 120 where the method 100 assesses whether the control system 58 has received a request to adjust the door lock schedule. If the control system 58 receives no request to adjust the door lock schedule, the method 100 returns to the start 110. If the control system 58 receives a request to adjust the door lock schedule, the method 100 moves to a step 130.

At the step 130, the method 100 adjusts the door lock schedule. The adjustments could include an adjustment to at least one deactivated period of the door lock schedule, an adjustment to at least one activated period of the door lock schedule, or both.

The method 100 then moves to a step 140 where a message is displayed confirming the adjustments. Next, at a step 150, the control system 58 receives a confirmation that the adjustments are correct or incorrect. If the adjustments are incorrect, the method 100 can move back to the step 130 where the door lock schedule can be readjusted. If the adjustments are correct, the method 100 moves to a step 160, where the adjustments are saved as the door lock schedule. The method 100 then ends at a step 170 and returns to the start 110.

Figure 6:
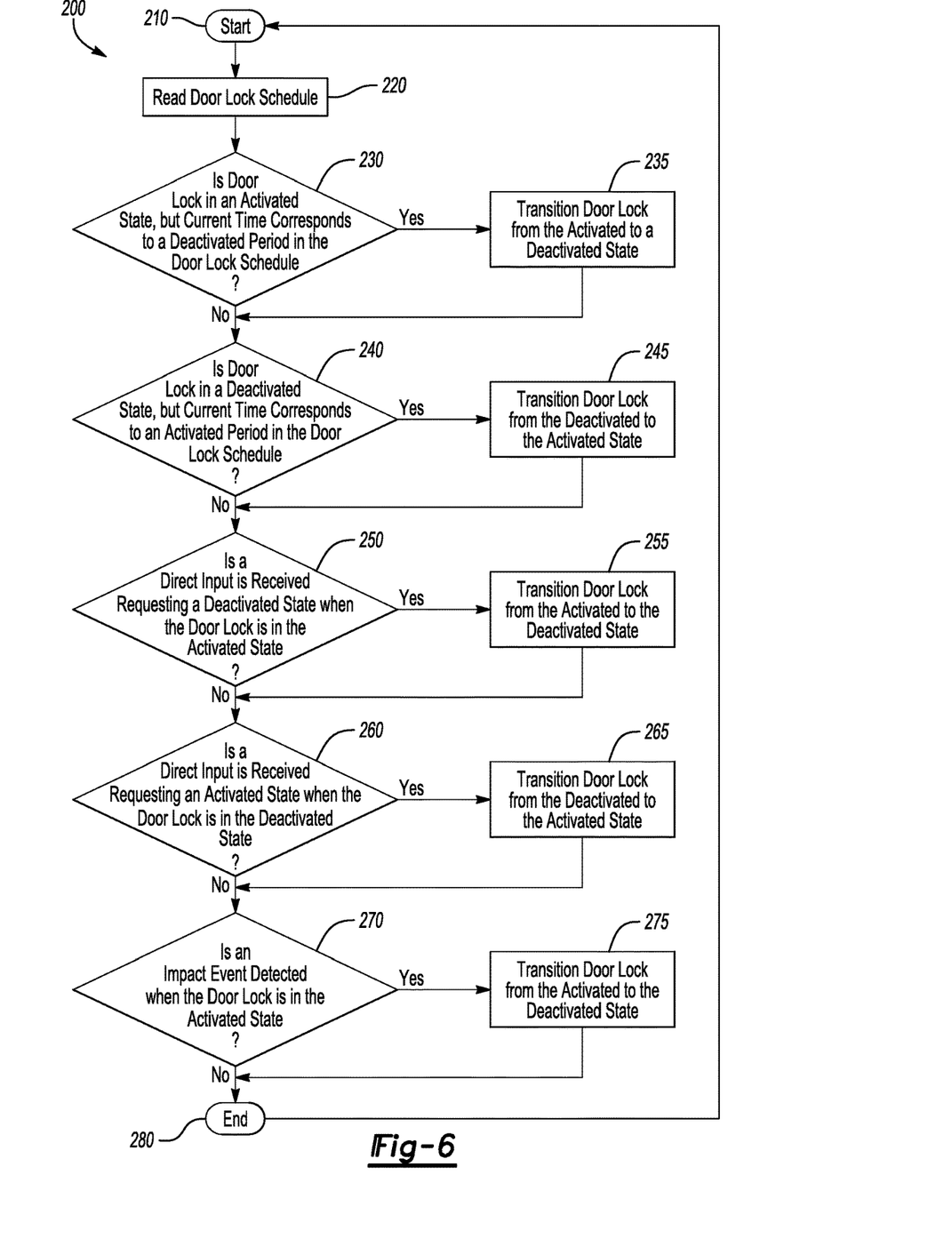
FIG. 6 illustrates a flow of an example door lock transitioning method utilized by the control system within the vehicle of FIG. 1.

Referring now to FIG. 6, with reference to FIGS. 2 and 4, an example door lock transitioning method 200 utilizes the door lock schedule shown on the display 54 of FIG. 4. As generally outlined below, the door lock automatically transitions back and forth between the activated and deactivated states based on the door lock schedule. Over time, the door lock schedule changes from the current time corresponding to a deactivated period to an activated period, and vice versa. The control system 58 can include an internal timer for tracking the current time.

The method 200 begins at a step 210. Next, at a step 220, the method 200 reads the door lock schedule.

The method 200 then moves to a step 230 where the method 200 assesses whether the door lock is in the activated state during a deactivated period of the door lock schedule. If the door lock is in the activated state, but the door lock schedule indicates that the door lock should be in the deactivated state, the method 200 moves to the step 235. At the step 235, the door lock is transitioned from the activated state to the deactivated state. If, at the step 235, the door lock is in the deactivated state and the door lock schedule indicates that the door lock should be in the deactivated state, the method 200 moves to the step 240.

At the step 240, the method 200 assesses whether the door lock is in the deactivated state during an activated period of the door lock schedule. If the door lock is in the deactivated state, but the door lock schedule indicates that the door lock should be in the activated state, the method 200 moves to the step 245. At the step 245, the door lock is transitioned from the deactivated state to the activated state. If, at the step 240, the door lock is in the activated state and the door lock schedule indicates that the door lock should be in the activated state, the method 200 moves to the step 250.

At the step 250, the method 200 assesses whether a direct input has been received requesting that the door lock transition to a deactivated state when the door lock is in an activated state. If the direct input is received at the step 250, the method 200 moves to the step 255 where the door lock is transitioned from the deactivated state to the activated state. If, at the step 250, the door lock is in the deactivated state, the method 200 moves to the step 260.

At the step 260, the method 200 assesses whether a direct input has been received requesting that the door lock transition to the activated state when the door lock is in the deactivated state. If the direct input is received at the step 260, the method 200 moves to the step 265 where the door lock is transitioned from the activated state to the deactivated state. If, at the step 260, the door lock is in the activated state, the method 200 moves to the step 270.

At the step 270, the method 200 assesses whether an impact event has been detected. If an impact event is detected, the method 200 moves to the step 275 where the door lock is transitioned from the activated state to the deactivated state. If, at the step 270, the door lock is in the deactivated state, or no impact event is detected, the method 200 moves to the step 280 where the method 200 ends and then moves to the start 210. The step 270 can ensure that a rear seat passenger can egress from the vehicle 10 after an impact event.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method, comprising:
    automatically transitioning a door lock of a vehicle from a deactivated state to an activated state based on a door lock schedule that includes at least one deactivated period where the door lock is scheduled to be in the deactivated state, and at least one activated period where the door lock is scheduled to be in the activated state;
    without transitioning the door lock, adjusting the at least one deactivated period, the at least one activated period, or both; and
    preventing an opening of a rear door from inside a passenger compartment of a vehicle when the door lock is in the activated state, and permitting the opening of the rear door from outside the passenger compartment when the door lock is in the activated state.

2. The method of claim 1, further comprising adjusting the door lock schedule in response to an input entered through a user interface of the vehicle.

3. The method of claim 2, wherein the input is provided by an occupant of the vehicle interacting with a touch screen display that provides the user interface of the vehicle.

4. The method of claim 1, wherein the transitioning is in response to the at least one deactivated period changing to the at least one activated period.

5. The method of claim 1, further comprising transitioning the door lock from the activated state to the deactivated state based on the door lock schedule.

6. The method of claim 1, further comprising overriding the door lock schedule by transitioning the door lock from the activated state to the deactivated state during the at least one activated period, the overriding based on a direct input from an operator of the vehicle, the direct input entered via a user interface of the vehicle.

7. The method of claim 1, wherein the door lock is a child lock, and further comprising overriding the door lock schedule by transitioning the child lock from the activated state to the deactivated state during the at least one activated period, the overriding based on an impact event.

8. The method of claim 1, wherein the door lock is a child lock of a driver side door of the vehicle that transitions based on the door lock schedule independently from a child lock of a passenger side door of the vehicle.

9. The method of claim 1, wherein the door lock is a first child lock associated with a driver side door of the vehicle and the door lock schedule is a first door lock schedule, and further comprising:
    transitioning a second child lock associated with a passenger side door of the vehicle in response to a second door lock schedule, the transitioning of first child lock in response to the first door lock schedule independent from the transitioning of the second child lock in response to the second door lock schedule.

10. An assembly, comprising:
    a door lock of a vehicle;
    a control system configured to transition the door lock from a deactivated state to an activated state based on a door lock schedule, the door lock schedule configured to be adjusted by a user without transitioning the door lock; and a rear door of the vehicle, wherein the lock, when in the activated state, prevents opening the rear door from inside a passenger compartment and permits opening the rear door from outside the passenger compartment.

11. The assembly of claim 10, further comprising a display of the vehicle having a user interface, the door lock schedule adjustable through the user interface.

12. The assembly of claim 10, wherein the control system is further configured to transition the door lock from the activated state to the inactivated state based on the door lock schedule.

13. The assembly of claim 10, wherein the door lock schedule includes at least one deactivated period where the door lock is scheduled to be in the deactivated state, and at least one activated period where the door lock is scheduled to be in the activated state.

14. The assembly of claim 13, further comprising a door lock override switch of the vehicle, the door lock override switch configured to actuate to cause the control system to transition the door lock from the activated state to the deactivated state during the at least one activated period.

15. The assembly of claim 14, wherein the door lock override switch is configured to actuate in response to a direct input from a user, the direct input entered via a user interface of the vehicle.

16. The assembly of claim 13, wherein the door lock is a child lock, wherein the control system is configured to transition the child lock from the activated state to the deactivated state during the at least one activated period based on an impact event.

17. The assembly of claim 10, wherein the door lock is a first child lock associated with a driver side door of the vehicle and the door lock schedule is a first door lock schedule, and further comprising:

a second child lock associated with a passenger side door of the vehicle, the control system configured to transition the second child lock from a deactivated state to an activated state based on a second door lock schedule without transitioning the first child lock from the deactivated state to the activated state.

18. An assembly, comprising:

a child lock of a vehicle driver side door; and a control system configured to transition the child lock from a deactivated state to an activated state based on a door lock schedule, the door lock schedule configured to be adjusted by a user without transitioning the child lock, the control system configured to transition the child lock without transitioning a child lock of a vehicle passenger side door.

\* \* \* \* \*

UNITED STATES PATENT AND TRADEMARK OFFICE
CERTIFICATE OF CORRECTION

PATENT NO. : 10,208,514 B2  
APPLICATION NO. : 15/466219  
DATED : February 19, 2019  
INVENTOR(S) : Monica Ramirez Monarrez, Adrian Romero Regaldo and Elizabeth Ramirez Monarrez

Page 1 of 1

It is certified that error appears in the above-identified patent and that said Letters Patent is hereby corrected as shown below:

In the Claims

In Claim 1, Column 8, Line 23; replace "passenger compartment of a vehicle" with --passenger compartment of the vehicle--

Signed and Sealed this  
Eighteenth Day of June, 2019

Andrei Iancu  
*Director of the United States Patent and Trademark Office*